United States Patent [19]

Streeter

[11] 4,054,193
[45] Oct. 18, 1977

[54] FLUID COUPLING DEVICE AND BIMETAL COIL ADJUSTMENT FOR USE THEREIN

[75] Inventor: Kenneth R. Streeter, Marshall, Mich.

[73] Assignee: Eaton Corporation, Cleveland, Ohio

[21] Appl. No.: 687,264

[22] Filed: May 17, 1976

[51] Int. Cl.² ............................................. F16D 31/08
[52] U.S. Cl. ................................. 192/58 A; 192/82 T
[58] Field of Search ................... 123/41.12; 192/58 B, 192/82 T; 236/101 D, 102; 337/84, 360

[56] References Cited

U.S. PATENT DOCUMENTS

| 2,200,852 | 5/1940 | Pond | 337/360 X |
|---|---|---|---|
| 3,055,473 | 9/1962 | Oldberg | 192/58 B |

*Primary Examiner*—Robert G. Nilson
*Attorney, Agent, or Firm*—Teagno & Toddy

[57] ABSTRACT

A fluid coupling device of the type including a rotatable coupling body defining a fluid operating chamber and a coupling member rotatable relative to the coupling body. A cover is associated with the coupling body and coupling member to define a fluid reservoir chamber, and a valve is operable to control fluid communication between the operating chamber and the reservoir chamber. The valve is mounted on a shaft which is rotatable relative to the cover and the rotational position of the shaft is controlled by a bimetallic coil having one end connected to the shaft and a second end which must be fixed relative to the cover. A bracket is fixedly attached to the cover and a clip member, in movable engagement with the bracket, receives the second end of the bimetal coil to prevent substantial rotational movement of the second end relative to the bracket. The clip member makes it possible to adjust the rotational position of the second end of the coil if, after assembly of the entire fluid coupling, it is found that the valve does not open within the specified temperature range.

19 Claims, 8 Drawing Figures

FLUID COUPLING DEVICE AND BIMETAL COIL ADJUSTMENT FOR USE THEREIN

BACKGROUND OF THE DISCLOSURE

The present invention relates to torque transmitting fluid couplings, and more particularly,, to such a coupling which utilizes a temperature-responsive bimetal coil to control the position of a valve which, in turn, controls the flow of fluid within the coupling.

Fluid couplings of the type to which the present invention relates are now well-known in the art and may be better understood by reference to U.S. Pat. Nos. 3,055,473, 3,174,600, and 3,339,689, assigned to the assignee of the present invention. Briefly, such fluid couplings typically include a coupling body which defines a fluid chamber, a coupling member rotatable relative to the coupling body, the body and member each including a plurality of concentric annular lands alternately positioned such that rotation of the coupling member causes the viscous fluid in the operating chamber and between the lands to exert a viscous drag on the coupling body, thereby rotating the body. The coupling also includes a valve plate and a cover, the valve plate dividing the chamber into a fluid operating chamber and a fluid reservoir chamber. The valve plate defines a fluid inlet port which permits fluid to pass from the reservoir chamber to the operating chamber, and a fluid discharge port which permits fluid to pass from the operating chamber to the reservoir chamber. A valve member controls the flow of fluid through the inlet port and discharge port in response to the atmospheric temperature external to the coupling. Typically, the valve member is mounted on a shaft which is rotatable relative to the cover, with one end of the bimetal coil being fixed to the shaft and the other end fixed relative to the cover by means of a bracket assembly.

Conventionally, the cover, bimetal coil, valve shaft, valve member and valve plate are assembled as a unit with the correctness of the position of the valve plate relative to the rest of the subassembly being determined by means of a water bath test wherein the bimetal coil is subjected to water at a predetermined temperature, usually the temperature at which it is intended that the valve member begin to uncover the inlet port to permit fluid to enter the operating chamber.

Subsequent to this testing operation, the remainder of the coupling is assembled, after which the entire assembly is tested under actual operating conditions. At this point, it is frequently determined that engagement of the coupling does not actually occur within the prescribed temperature range, either because the setup of the water bath test was improper or defective, or for any other reason. When such is the case, it is necessary either to scrap the entire coupling assembly, or to forceably disassemble it in a attempt to salvage some of the parts, typically, only such items as the bimetal coil and bearing set. The need to scrap almost the entire coupling assembly is clearly undesirable in any case, but especially, on those couplings such as for trucks, which are larger and more expensive to manufacture.

SUMMARY OF THE INVENTION

Accordingly, it is an object of the present invention to provide an improved fluid coupling device of the type including valving controlled by a bimetal element wherein the operational temperature setting of the valving may be adjusted after assembly of the entire fluid coupling.

It is a related object of the present invention to provide such a fluid coupling wherein one end of the bimetal element is attached to the valving and the other end is held fixed relative to the coupling cover by means of a clip member which is movable to permit adjustment in the rotational position of the fixed end of the bimetal element.

The above and other objects of the present invention are accomplished by the provision of an improved fluid coupling device of the type including a first rotatable member, cover means associated with the first member to define a fluid chamber therebetween, and a valve plate disposed to separte the fluid chamber into a fluid operating chamber and fluid reservoir chamber. A second rotatable member is disposed in the fluid operating chamber and is rotatable relative to the first member, and a valve means is operable to control fluid communication between the operating chamber and the reservoir chamber. The valve means is controlled by a bimetal element having a first end portion connected to the valve means and a second end portion fixed relative to the cover. A bracket is fixedly attached to the cover and a clip member, disposed in movable engagement with the bracket, includes means receiving the second end portion of the bimetal element to prevent substantial rotation of the second end portion of the coil relative to the first end portion, and relative to the bracket.

In accordance with a more limited aspect of the present invention, the bracket means includes a generally flat terminal portion extending away from the cover means and said clip member is generally U-shaped and disposed to receive the terminal portion therein. The terminal portion defines an opening having a width approximately equal to the desired amount of adjustability of the second end portion of the bimetal element.

DESCRIPTION OF THE PREFERRED EMBODIMENTS

Figure 1:
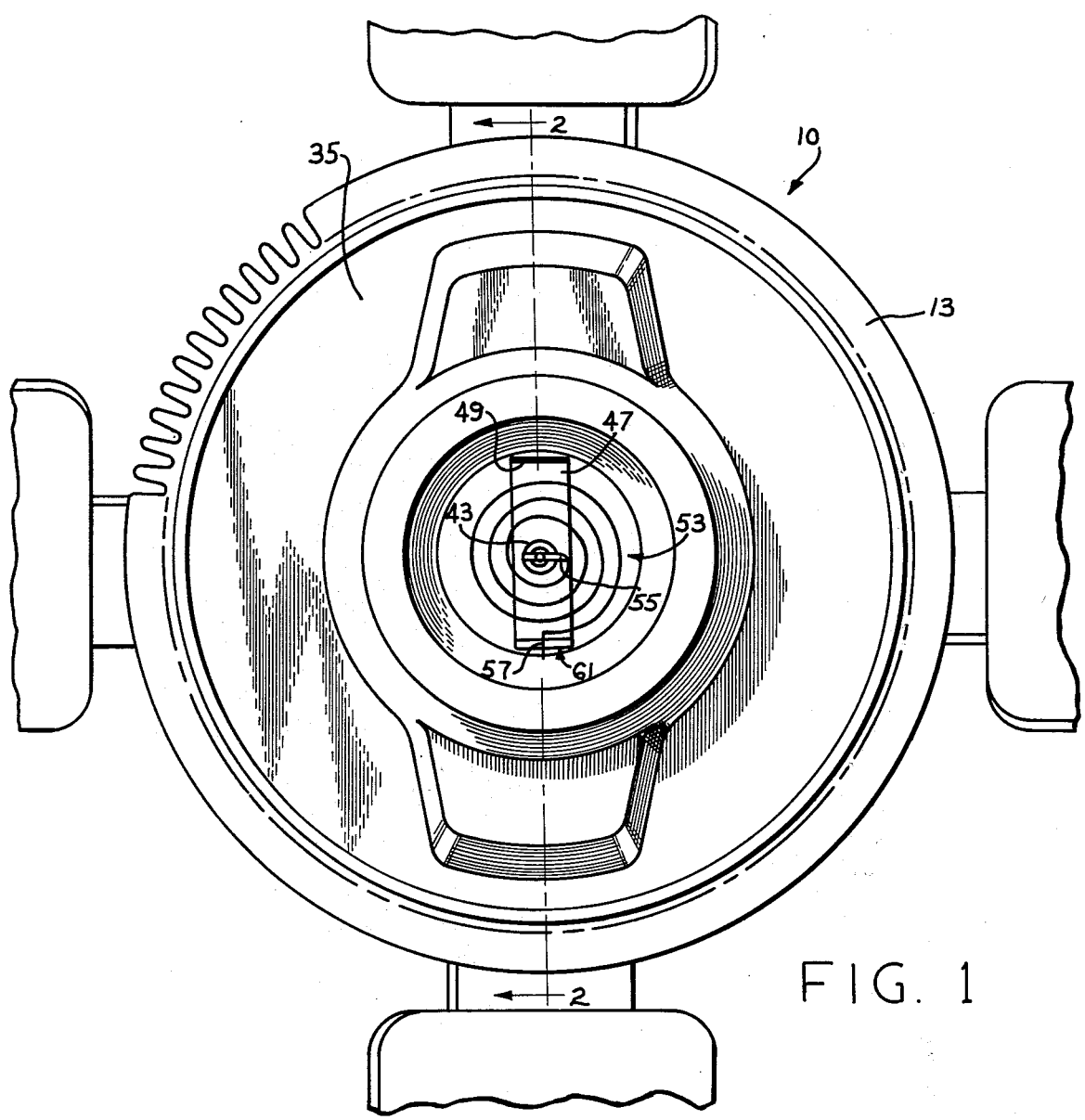
FIG. 1 is a top plan view of a typical fluid coupling utilizing the coil adjustment arrangement of the present invention.
Figure 2:
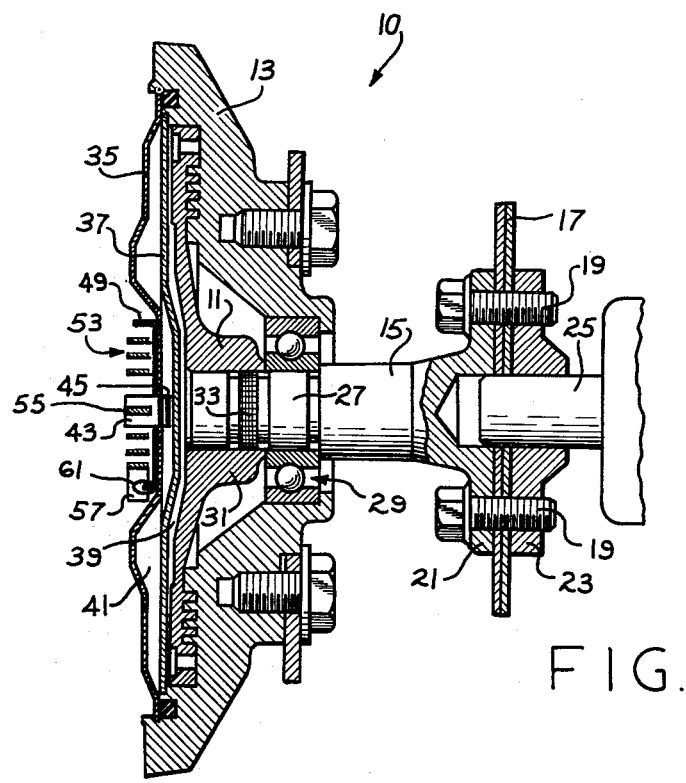
FIG. 2 is a cross section taken on line 2—2 of FIG. 1, and on a smaller scale.

Referring now to the drawings, which are not intended to limit the present invention, FIG. 1 and FIG. 2 illustrate the preferred form of a fluid coupling device, generally designated 10, with which the present invenion may be utilized. The fluid coupling device 10 includes an input coupling member 11 and an output coupling member 13. The fluid coupling 10 is shown herein as a drive for an automotive engine accessory, and specifically, as a drive for a radiator cooling fan. It will be understood, however, that the use of the present invention is not limited to any particular fluid coupling application, but is usable with any fluid coupling device of the type shown wherein it is desired to provide for final adjustment of a bimetal element after assembly of the device.

The fluid coupling 10 includes an input shaft 15 on which input member 11 is mounted and which is rotatable, such as by means of a belt drive, including a pulley member 17 (only a portion of which is shown). The pulley member 17 is connected to the input shaft 15 at one end thereof by suitable screws 19 which extend through a flange portion 21 on the end of the shaft 15 and through openings in the pulley 17. The screws 19 are threaded into a hub plate 23 located on the side of the pulley opposite the flange portion 21, thereby effectively clamping the pulley 17 between the flange portion 21 and the hub plate 23. The hub plate 23 is suitably mounted on a stub shaft 25, which is rotatably supported by the engine block.

The input shaft 15 has a reduced shaft portion 27 intermediate its ends, and functioning as a support for the inner race of bearing set 29.

The input member 11 is in the form of a disc having a hub portion 31 supported by the shaft 15. The hub portion 31 has an opening therethrough which has an interference fit with a serrated portion 33 of shaft 15. The hub portion 31 is pressed onto the shaft 15 until it abuts the side of the inner race of bearing set 29, and the output end (left end in FIG. 2) of the shaft 15 is balled over to positively retain the input member 11 on the shaft, such that rotation of the shaft 15 causes rotation of the input member 11.

The output member 13 cooperates with a cover member 35 to define a fluid chamber therebetween, the fluid chamber being separated by a valve plate 37 into a fluid operating chamber 39 and a fluid reservoir chamber 41. Rotatably supported by the cover member 35 is a valve shaft 43 having attached to its inner end (right end in FIG. 2) a valve arm 45, the construction and operation of which may be better understood by reference to the above-mentioned U.S. Pat. No. 3,055,473.

Attached, as by welding, to the outer surface of the cover member 35 is a bracket member 47, including a pair of terminal portions 49 and 51, which are oriented generally perpendicular to the main portion of the bracket member 47.

The rotational position of the valve arm 45 is controlled, through valve shaft 43, by means of a temperature-responsive bimetal element, generally designated 53, shown in the preferred embodiment as a helically-wound bimetal coil. It will be appreciated however that the scope of the present invention is not limited to any particular configuration of bimetal element, but may include the use of any bimetal element which has one portion thereof connected to a control means and another portion thereof held "fixed", relative to the device, such that the operating or control range of the control means may be varied or adjusted by moving the "fixed" portion of the bimetal element, the effect of which will be readily understood by those skilled in the art. As used herein, it will be appreciated that the term "fixed" means that the particular portion of the bimetal element is held stationary relative to the device (e.g., the cover member 35) under normal assembly and operating conditions, but may be manually moved to a new stationary position to correct the temperature control range of the bimetal element.

As may best be seen in FIGS. 1 and 2, the bimetal coil 53 includes an end portion 55 positioned within a slot in the valve shaft 43, and a second end portion 57 (fixed end), the rotational position of which, relative to the first end portion 55, will determine the temperature range within which movement of the valve arm 45 will occur.

Figure 5:
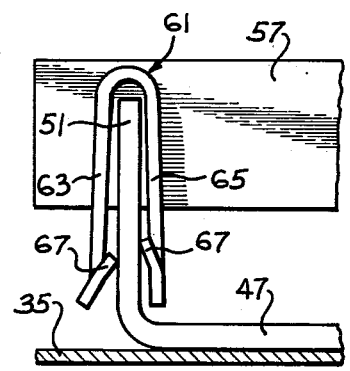
FIG. 5 is a side elevation of the adjustment arrangement of the invention, taken on line 5—5 of FIG. 4.

Disposed over the terminal portion 51 of the bracket 47 is a clip member 61 which, as may best be seen in FIG. 5, is generally U-shaped and includes a pair of side walls 63 and 65. Each of the side walls 63 and 65 includes a pair of tangs 67 which are bent inwardly (see FIG. 5) to engage terminal bracket portion 51 and prevent movement of the clip member 61 axially along the bracket portion 51, except when such movement is desirable.

Figure 3:
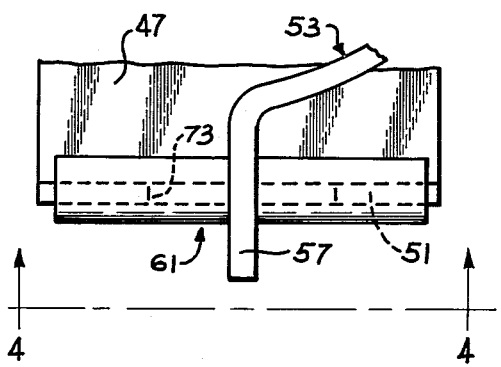
FIG. 3 is a fragmentary plan view, similar to FIG. 1, on a larger scale, showing the adjustment arrangement of the present invention.
Figure 4:
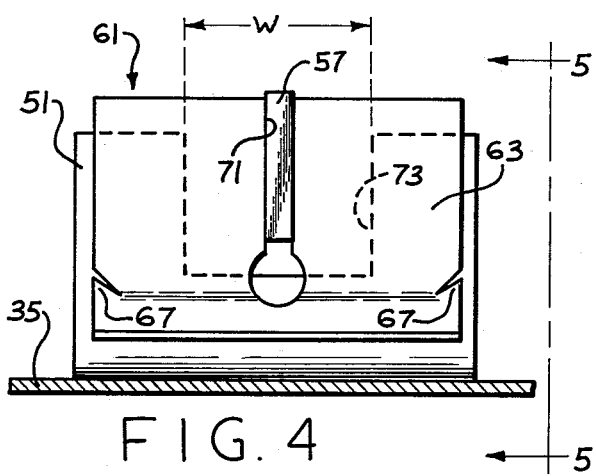
FIG. 4 is a front elevation, taken on line 4—4 of FIG. 3.

Each of the side walls 63 and 65 define a slot 71, the slots 71 being properly aligned to receive the second end portion 57 of the bimetal coil extending therethrough, as shown in FIG. 3, and prevent substantial movement of the second end portion 57 along the axis of the clip member 61. As may best be seen in FIG. 4, the terminal bracket portion 51 defines an opening 73 having a width W which is preferably selected to provide sufficient adjustability of the second end portion 57, i.e., rotation of the second end portion 57 about the axis of the valve shaft 43, or about the first end portion 55. Therefore, the width W is typically about equal to the predetermined, desired adjustability of end portion 57 in a direction parallel to the axis of the clip member 61.

Figure 6:
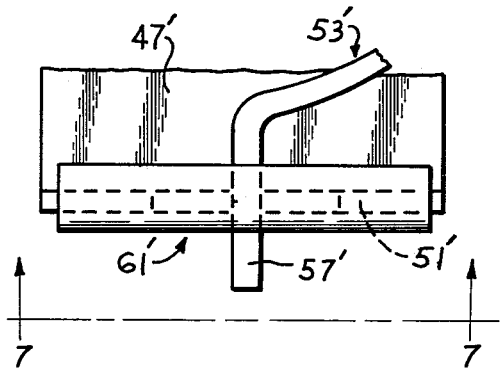
FIG. 6 is a fragmentary plan view, similar to FIG. 3 illustrating an alternative embodiment of the invention.
Figure 7:
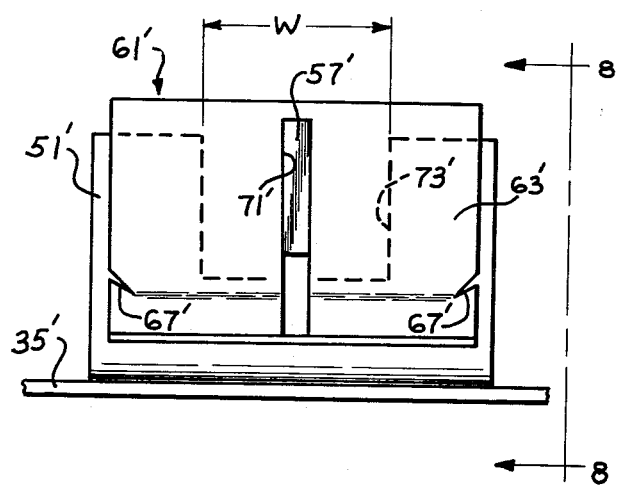
FIG. 7 is a front elevation, taken on line 7—7 of FIG. 6.
Figure 8:
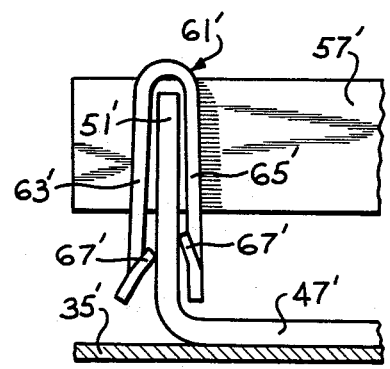
FIG. 8 is a side elevation of the alternative embodiment, taken on line 8—8 of FIG. 7.

Referring now to FIGS. 6–8, wherein like elements are referenced by like numerals, bearing a prime, there is shown an alternative embodiment of the clip member. On clip member 61, the slots 71 open from the "top" of the clip, i.e., the portion opposite the bracket member 47. On clip member 61', the slots 71' open from the "bottom" of the clip, i.e., the portion adjacent the bracket 47'. This alternative arrangement may be preferred in situations where there would be a tendency for the second end portion 57 to become disengaged from the slots 71 of the clip member 61, as a result of either vibration or vandalism.

From the foregoing description it may be seen that the present invention provides an adjustment arrangement whereby the present invention provides an adjustment arrangement whereby the second end portion 57 of the bimetal element may be adjusted to a new position to change the temperature at which movement of the valve arm will occur. It is anticipated that certain alterations and modifications of the preferred embodiment will occur to those skilled in the art upon a reading of the specification and it is intended that all such alternations and modifications are part of the invention insofar as they come within the scope of the appended claims. However, it is an essential feature of the present invention that the coupling device include a bracket means fixed relative thereto, and a clip member is normally-fixed engagement with the bracket means under normal operation conditions, but movable relative to the bracket means when it is desired to move the "fixed" end portion of the bimetal element, which is received by the clip member.

I claim:

1. A fluid coupling device including a first rotatable member, cover means associated with said first member to define a fluid chamber therebetween, a valve plate disposed to separate said fluid chamber into a fluid operating chamber and a fluid reservoir chamber, a second rotatable member disposed in said fluid operating chamber and rotatable relative to said first member, valve means operable to control fluid communication between said operating chamber and said reservoir chamber, temperature-responsive means controlling said valve means, said temperature-responsive means including a bimetal element having a first end portion operatively connected to said valve means and a second end portion, bracket means fixed relative to said device and including a generally flat terminal portion extending away from said cover means, a clip member including means receiving said second end portion of said bimetal element and substantially preventing rotational movement of said second end portion relative to said first end portion, said clip member being disposed in movable engagement with said terminal portion of said bracket means to provide rotational adjustment of said second end portion of said bimetal element.

2. A device as claimed in claim 1 wherein said clip member in generally U-shaped and disposed to receive said terminal portion therein.

3. A device as claimed in claim 2 wherein said clip member defines an axis oriented generally parallel to the plane of said terminal portion.

4. A device as claimed in claim 3 wherein said U-shaped clip member includes a pair of oppositely-disposed sidewalls, each of said sidewalls defining a slot, said receiving means comprising said slots.

5. A device as claimed in claim 4 wherein said second end portion is received by said sidewall slots to orient said second end portion generally perpendicular to said axis.

6. A device as claimed in claim 2 including a valve shaft rotatably disposed relative to said cover means and operatively connected to said valve means, said valve shaft including means receiving said first end portion of said bimetallic element.

7. A device as claimed in claim 6 wherein said clip member defines an axis and is oriented to define a chord of a circle having its center generally coincidental with the axis of said valve shaft.

8. A device as claimed in claim 2 wherein said terminal portion defines an opening, at least a major portion of said opening being disposed within said U-shaped clip member to have said second end portion of said bimetal element passing therethrough.

9. A device as claimed in claim 8 wherein said opening has a width approximately equal to a predetermined amount of adjustability of said second end portion of said bimetal element.

10. A fluid coupling device including a first rotatable member, cover means associated with said first member to define a fluid chamber therebetween, a valve plate disposed to separate said fluid chamber into a fluid operating chamber and a fluid reservoir chamber, a second rotatable member disposed in said fluid operating chamber and rotatable relative to said first member, valve means operable to control fluid communication between said operating chamber and said reservoir chamber, temperature-responsive means controlling said valve means, said temperature-responsive means including a bimetal coil having an inner end portion operatively connected to said valve means and an outer end portion, bracket means fixedly attached to said cover means, a clip member in normally-fixed engagement with said bracket means and including means receiving said outer end portion of said bimetal coil to prevent rotational movement of said outer end portion relative to said inner end portion, said clip member being gnerally U-shaped to define an axis and being axially movable relative to said bracket means to provide angular adjustment of said outer end portion of said bimetal coil.

11. A device as claimed in claim 10 wherein said bracket means includes a generally flat terminal portion oriented generally perpendicular to said cover means and disposed to define a chord of a circle having its center generally coincidental with said inner end portion of said bimetal coil.

12. A device as claimed in claim 11 wherein said U-shaped clip member includes a pair of oppositely-disposed sidewalls receiving said terminal portion of said bracket means therebetween.

13. A device as claimed in claim 12 wherein each of said sidewalls of said clip member defines a slot, said receiving means of said clip member comprising said sidewall slots.

14. a device as claimed in claim 13 wherein said outer end portion of said bimetal coil passes through said sidewall slots to orient said outer end portion generally perpendicular to the plane of said terminal portion of said bracket means.

15. A device as claimed in claim 13 wherein each of said sidewall slots extends from a portion of the respective sidewall disposed adjacent said bracket means.

16. A device as claimed in claim 13 wherein each of said sidewall slots extends from the open end of said U-shaped clip member.

17. A device as claimed in claim 13 wherein each of said sidewall slots extends from a portion of the respective sidewall oppositely disposed from said bracket means.

18. A device as claimed in claim 12 wherein said terminal portion defines an opening, at least a major portion of said opening being disposed between said sidewalls, said outer end portion of said bimetal coil passing through said opening.

19. A device as claimed in claim 18 wherein said opening has a width approximately equal to a desired amount of axial adjustability of said outer end portion of said bimetal coil.

* * * * *